United States Patent
Giacomini et al.

(10) Patent No.: US 11,635,250 B2
(45) Date of Patent: Apr. 25, 2023

(54) VALVE SYSTEM FOR A REFRIGERATOR APPLIANCE

(71) Applicant: WHIRLPOOL CORPORATION, Benton Harbor, MI (US)

(72) Inventors: Neomar Giacomini, Saint Joseph, MI (US); Pratyaksh Rohatgi, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 101 days.

(21) Appl. No.: 17/150,245

(22) Filed: Jan. 15, 2021

(65) Prior Publication Data
US 2022/0228799 A1 Jul. 21, 2022

(51) Int. Cl.
*F16K 31/06* (2006.01)
*F25D 23/12* (2006.01)
*F16K 27/02* (2006.01)

(52) U.S. Cl.
CPC .......... *F25D 23/126* (2013.01); *F16K 27/029* (2013.01); *F16K 31/0644* (2013.01); *F25D 2323/122* (2013.01)

(58) Field of Classification Search
None
See application file for complete search history.

(56) References Cited

U.S. PATENT DOCUMENTS

| | | | |
|---|---|---|---|
| 5,662,392 A * | 9/1997 | Hinz | B60T 8/3675 303/119.2 |
| 5,865,511 A * | 2/1999 | Hinz | B60R 16/0239 303/119.2 |
| 5,868,279 A | 2/1999 | Powell | |
| 6,076,551 A * | 6/2000 | Miyazoe | G01F 15/005 137/554 |
| 6,220,300 B1 * | 4/2001 | Schudt | F16H 61/0009 137/884 |
| 6,260,582 B1 * | 7/2001 | Trautmann | H02K 7/14 137/884 |
| 6,303,031 B1 * | 10/2001 | Senner | B01D 35/143 210/DIG. 17 |
| 7,210,601 B2 | 5/2007 | Hortin et al. | |
| 8,047,234 B2 * | 11/2011 | Takada | F15B 13/0896 137/884 |
| 8,780,564 B2 * | 7/2014 | Yanai | B60T 13/686 361/752 |

(Continued)

*Primary Examiner* — Matthew W Jellett
(74) *Attorney, Agent, or Firm* — Brooks Kushman P.C.

(57) ABSTRACT

A refrigerator appliance includes a water system. The water system has a fluid circuit and valve assembly. The valve assembly is configured to control flow through the fluid circuit. The valve assembly has a valve, at least one actuator disposed on the valve, and a framework configured to secure the at least one actuator to the valve. The framework has first and second upright members, a crossmember, and an electrical connector. The first and second upright members secured to the valve on opposing sides of the at least one actuator. The crossmember is secured to opposing ends of the first and second upright members relative to the valve such that the valve, first upright member, second upright member, and crossmember form a closed loop around the at least one actuator. The electrical connector is electrically connected to the at least one actuator and is secured to the crossmember.

18 Claims, 7 Drawing Sheets

(56) References Cited

U.S. PATENT DOCUMENTS

| | | | |
|---|---|---|---|
| 9,593,790 B2* | 3/2017 | Hite | F16K 1/00 |
| 10,072,764 B2* | 9/2018 | No | F16K 31/06 |
| 2008/0185547 A1* | 8/2008 | Tsuruta | F16K 31/0658 |
| | | | 251/129.15 |
| 2009/0114865 A1* | 5/2009 | Homann | F16K 27/003 |
| | | | 251/129.15 |
| 2012/0153199 A1* | 6/2012 | Nguyen | F16K 31/0679 |
| | | | 251/129.15 |
| 2014/0117266 A1* | 5/2014 | Jung | F16K 27/003 |
| | | | 251/129.15 |
| 2016/0229677 A1 | 8/2016 | Girault et al. | |

* cited by examiner

VALVE SYSTEM FOR A REFRIGERATOR APPLIANCE

TECHNICAL FIELD

The present disclosure relates to an appliance such as a refrigerator.

BACKGROUND

In order to keep food fresh, a low temperature must be maintained within a refrigerator to reduce the reproduction rate of harmful bacteria. Refrigerators circulate refrigerant and change the refrigerant from a liquid state to a gas state by an evaporation process. A compressor increases the pressure, and in turn, the temperature of the gas refrigerant. This heated gas is then cooled by ambient air received from one or more vents often disposed on a rear portion of the refrigerator.

Refrigerators may also include systems that require a water supply. Such systems may be configured to produce ice cubes or to deliver water to a user via a dispensing device that may be located on a door of the refrigerator.

SUMMARY

A valve assembly includes a valve, at least one solenoid, and a framework. The valve is configured to control fluid flow between fluid conduits. The at least one solenoid is disposed on the valve and is configured to operate the valve to control fluid flow through fluid conduits. The framework is configured to secure the at least one solenoid to the valve. The framework has a first support member, a second support member, and a printed circuit board. The first support member is secured to the valve. The second support member is spaced apart from the first support member and is secured to the valve such that the at least one solenoid is sandwiched between the first and second support members. The printed circuit board is electrically connected to the at least one solenoid and is secured to opposing ends of the first and second support members relative to the valve such that the at least one solenoid is sandwiched between the valve and the printed circuit board.

A refrigerator appliance includes a water system. The water system has a fluid circuit and valve assembly. The valve assembly is configured to control flow through the fluid circuit. The valve assembly has a valve, at least one actuator disposed on the valve, and a framework configured to secure the at least one actuator to the valve. The framework has first and second upright members, a crossmember, and an electrical connector. The first and second upright members secured to the valve on opposing sides of the at least one actuator. The crossmember spans and is secured to opposing ends of the first and second upright members relative to the valve such that the valve, first upright member, second upright member, and crossmember form a closed loop around the at least one actuator. The electrical connector is electrically connected to the at least one actuator and is secured to the crossmember on an opposing side of the crossmember relative to the at least one actuator.

A valve assembly includes a valve, a solenoid, and a bracket. The valve is configured to control fluid flow between fluid conduits. The solenoid is disposed on the valve and is configured to operate the valve to control fluid flow through fluid conduits. The bracket has first and second side members, a crossmember, and a plate. The crossmember is secured to the first and second side members such that the first and second side members and the crossmember form a U-shape having an open end. Each of the side members are secured to the valve such that the solenoid is sandwiched between the first and second side members and such that the solenoid is sandwiched between the valve and the crossmember. The plate extends from the crossmember and away from the open end. The electrical connector is electrically connected to the solenoid and is secured to the plate member.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
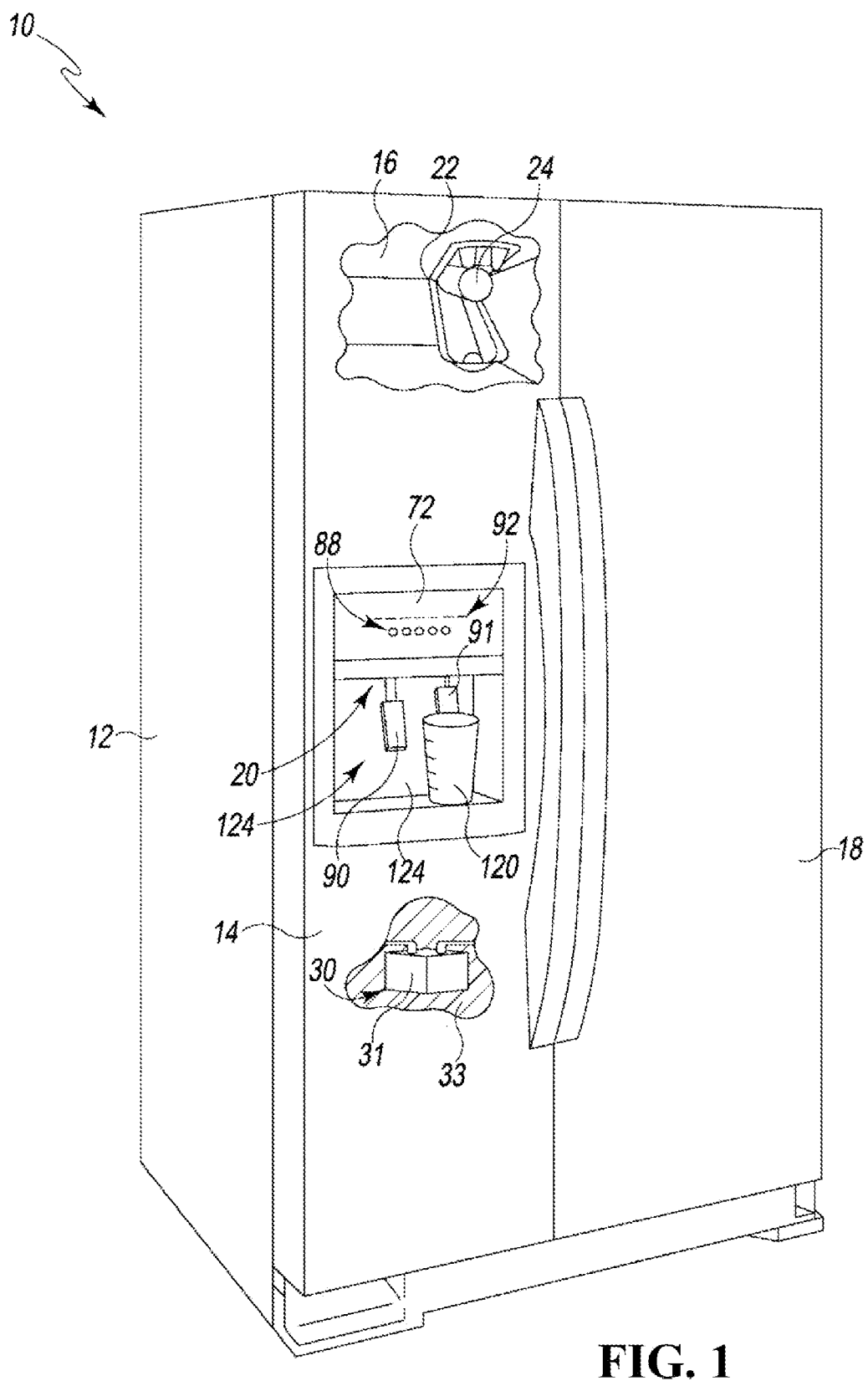
FIG. 1 is an isometric view of a refrigerator appliance.

Referring to FIG. 1, a home appliance is shown as a domestic refrigerator appliance 10 (hereinafter refrigerator 10). The refrigerator 10 includes a cabinet 12, a refrigerator door 14 for accessing a refrigerated compartment 16 of the refrigerator 10, and a freezer door 18 for accessing a frozen compartment (not shown) of the refrigerator 10.

The refrigerator 10 also includes a dispenser 20 coupled to the refrigerator door 14 and a water filter port 22 located inside the refrigerated compartment 16 of the cabinet 12. A descaling cartridge 24 is sized to be received in the water filter port 22. The dispenser 20 is configured to dispense cold water, hot water, and/or ice from the refrigerator 10. The water filter port 22 is fluidly coupled to the dispenser 20 and is configured to receive removable water filters that filter water (both liquid and ice) dispensed through dispenser 20. The descaling cartridge 24 is configured to be installed in the water filter port 22 to disperse descaling solution in the water lines leading to the dispenser 20 so that scale build-up in the water lines can be flushed through the dispenser 20.

Figure 2:
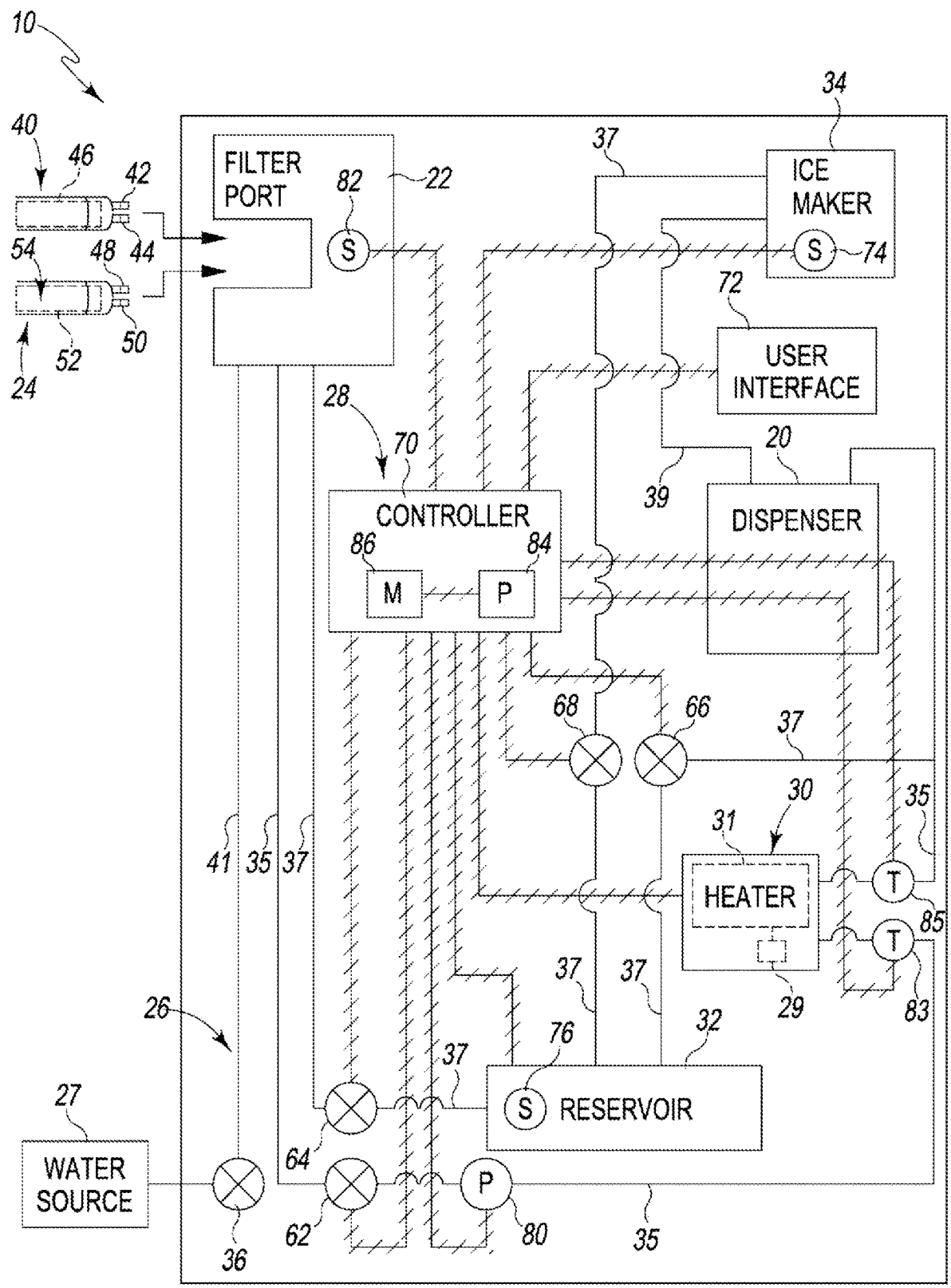
FIG. 2 is a diagrammatic view of the refrigerator appliance.

Referring now to FIG. 2, the refrigerator 10 includes a water system 26 and a control system 28 for controlling the water system 26. The water system 26 directs water from a water source 27 to the dispenser 20. The control system 28 is operable to control the various components of the water system 26 so that the dispenser 20 dispenses cold water, hot water, or ice. The control system 28 is also operable to control the water system 26 during a pre-programmed descaling cycle or other pre-programmed cycle.

The water system 26 includes a number of components for conditioning water to be discharged through the dispenser 20. In particular, the water system has a heating assembly 30, a cold water reservoir 32, and an icemaker 34. The heating assembly 30 includes a flow-through heating element 31 and a thermal fuse 29 configured to cut power to the flow-through heating element 31 when the flow-through heating element 31 reaches a predetermined temperature. The heating assembly 30 is positioned between the water filter port 22 and the dispenser 20 along a hot water line 35. The cold water reservoir 32 accumulates and cools water in the refrigerator 10 prior to the water being discharged through the dispenser 20 or supplied to the ice maker 34. The cold water reservoir 32 is positioned between the water filter port 22 and the dispenser 20 along a cold water line 37. The icemaker 34 receives cold water from the cold water reservoir 32 and generates ice that is discharged through the dispenser 20 via an ice line 39.

One exemplary flow-through heating element 31 is a Ferro Flow Through Heater (FTH). The flow-through heating element 31 is positioned in the refrigerator door 14 below the dispenser 20 and outside a refrigerator insulation layer 33 as shown, for example, in FIG. 1. The flow-through heating element 31 is illustratively oriented in a flat orientation so that water flows in a substantially horizontal direction through the flow-through heating element 31. In some embodiments, the flow-through heating element 31 may be a thermoblock element, a microwave element, or another suitable type of heating element. Additionally, the heating element may be positioned in another location in the door 14 or the cabinet 12 and may be placed in a number of orientations relative thereto. In alternative embodiments of the present disclosure, the flow-through heating element 31 may be replaced or augmented by a batch heating system including a heating element and a hot water reservoir.

All the water (liquid or ice) dispensed by the refrigerator 10 passes through the water filter port 22. The water system 26 includes a main valve 36 coupled to the water source 27 and the water filter port 22 is coupled to the main valve 36 via a water inlet line 41. The hot water line 35 and the cold water line 37 extend from the water filter port 22 directing water through the rest of the water system 26. The main valve 36 can be manually opened or closed to selectively allow water from the water source 27 to enter the water system 26 of the refrigerator 10.

The water filter port 22 is configured to receive a water filter cartridge 40 or the descaling cartridge 24. The water filter cartridge 40 is illustratively consumable and discarded after use. The water filter cartridge 40 includes an inlet 42, an outlet 44, and a filter media 46 as is known in the art. In other embodiments, the water filter cartridge 40, or portions thereof, may be reusable. The descaling cartridge 24 is illustratively consumable and is charged to supply enough descaling agent 54 for one descaling cycle. In other embodiments, the descaling cartridge 24 may be refillable and/or reusable.

The descaling cartridge 24 includes an inlet 48, an outlet 50, and a descaling packet 52 containing descaling agent 54. The inlet 48 is open to the water lines of the refrigerator 10. The descaling packet 52 is coupled to the outlet 50 and is squeezed by water flowing into the descaling cartridge 24 so that the descaling agent 54 is dispensed through the outlet 50 into the water lines. Water ceases to flow into the descaling cartridge 24 when the descaling cartridge 24 is full of water and the descaling packet 52 is emptied. The descaling agent 54 is then advanced through the water system 26 and reacts with the scale built up in the water system 26 so that the scale can be flushed out of the water system 26 when the reacted descaling agent 54 is discharged through the dispenser 20. In the illustrative embodiment, the descaling agent 54 is a solution with about an 8 percent concentration of acetic acid. In other embodiments, other organic acids including but not limited to sulfonic acids or carboxylic acids, in particular, lactic acid, acetic acid, formic acid, oxalic acid, uric acid solutions may be used alone or mixtures thereof. It is also possible to use inorganic acids such as phosphoric acid, hydrochloric acid or sulfamic acid solutions. Mixtures of various inorganic and organic acids could also conceivably be used as descaling agents in accordance with embodiments of the present invention.

In other embodiments, the inlet 48 and the outlet 50 may both be open to the water lines of the refrigerator 10. In such embodiments, the descaling packet 52 may be open inside the descaling cartridge 24 or opened when water enters the descaling cartridge 24 so that water flowing through the descaling cartridge is mixed with descaling agent. The water mixing with the descaling agent 54 dilutes and carries the descaling agent through the water lines of the refrigerator 10. In some such embodiments, the descaling agent 54 may be a liquid descaling agent or a solid agent.

The water system 26 further includes a number of electronically controlled valves that can be operated to supply hot or cold water to the dispenser 20 or to supply cold water to the icemaker 34. Specifically, the water system includes a hot water valve 62, a cold water valve 64, a cold water dispenser valve 66, and an icemaker valve 68. The hot water valve 62 is coupled between the water filter port 22 and the dispenser 20 along the hot water line 35. The cold water valve 64 is coupled between the water filter port 22 and the dispenser 20 along the cold water line 37. The cold water dispenser valve 66 is coupled between the cold water reservoir 32 and the dispenser 20 along the cold water line 37. The icemaker valve 68 is coupled between the cold water reservoir 32 and the icemaker 34 along the cold water line 37.

In operation, the hot water valve 62 can be opened to advance water from the water source 27 through the heating assembly 30 to the dispenser 20. The cold water valve 64 can be opened to advance water from the water source 27 to the cold water reservoir 32. The cold water dispenser valve 66 can be opened to advance cold water from the cold water reservoir 32 to the dispenser 20. The icemaker valve 68 can be opened to advance water from the cold water reservoir 32 to the icemaker 34. Otherwise, each of the valves 62, 64, 66, 68 are biased closed to prevent water from being advanced through the water system 26.

The control system 28 of the refrigerator 10 illustratively includes a controller 70, a user interface 72, and a number of sensors 74, 76, 80, 82, 83, 85. The controller 70 is configured to operate the components of the water system 26 in response to inputs from the user interface 72 and the sensors 74, 76, 80, 82, 83, 85. The user interface 72 is configured to display information and to receive user inputs. The sensors 74, 76, 80, 82, 83, 85 detect information and communicate information to the controller 70.

The controller 70 includes a number of electronic components commonly associated with electronic units which are utilized in the control of electromechanical systems. For example, the controller 70 may include, amongst other components customarily included in such devices, a processor such as a microprocessor 84 and a memory device 86 such as a programmable read-only memory device ("PROM") including erasable PROM's (EPROM's or EEPROM's). The memory device 86 is provided to store, amongst other things, instructions in the form of, for example, a software routine (or routines) which, when executed by the processor, allows the controller 70 to control operation of the water system 26 and other systems included in the refrigerator 10.

The user interface 72 is illustratively coupled to the controller 70 for two way communication via a signal line as shown in FIG. 2. User interface 72 includes buttons 88, paddles 90, 91, and indicator lights 92 as shown in FIG. 1. The buttons 88 may be pressed to receive user inputs requesting that water dispensed be cold or hot, that ice dispensed be cubed or crushed, or that pre-programmed cycles (such as the descaling cycle) be performed by the refrigerator 10. The paddles 90, 91 may be pressed so that the controller 70 receives inputs requesting that water or ice be discharged by the dispenser 20. The indicator lights 92 may be used to indicate the temperature of water to be dispensed, the type of ice to be dispensed, the status of the water filter cartridge 40, the need for a descaling cycle, the availability of one or more functions of the refrigerator 10, or other information. In some embodiments, the user interface 72 may include a graphic display, a touch screen, or other interface operable to display information and to receive user inputs.

The controller 70 is electrically coupled to each of the sensors 74, 76, 80, 82, 83, 85 to receive inputs from each of the sensors 74, 76, 80, 82, 83, 85 as shown in FIG. 2. In particular, the sensors 74, 76, 80, 82, 83, 85 include an ice level sensor 74, a reservoir sensor 76, temperature sensors 83, 85, a pressure sensor 80, and a filter port sensor 82. The ice level sensor 74 is coupled to the controller 70 via a signal line and is configured to detect if an ice bucket (not shown) included in the ice maker 34 is full. The reservoir sensor 76 is coupled to the controller 70 via a signal line and is configured to detect if the cold water reservoir 32 is full or the water level in the cold water reservoir 32. In the illustrative embodiment, water discharged through the dispenser 20 after being heated in the heating assembly 30 may be between 175-185° F., and may be typically be about 180° F. In other embodiments, water discharged through the dispenser 20 after being heated in the heating assembly 30 may be hotter or cooler. The pressure sensor 80 is coupled to the controller 70 via a signal line and is configured to detect back pressure applied to the heating assembly 30 through the hot water valve 62. In some embodiments, the hot water valve 62 may be configured to regulate the pressure being supplied to the heater assembly 30. The filter port sensor 82 is coupled to the controller 70 via a signal line and is configured to detect the presence of the water filter cartridge 40 or the descaling cartridge 24. The temperature sensors 83, 85 are coupled to the controller 70 and are configured to monitor the temperature of water entering and exiting the heating assembly 30. If the temperature difference between the sensors 83, 85 across the heating assembly 30 is determined by the controller 70 to be outside a predetermined range, the controller 70 may disable the heating assembly 30.

Additionally, the controller 70 is electrically coupled to the electrically controlled valves 62, 64, 66, 68 and the heating assembly 30 as shown in FIG. 2. Specifically, the cold water valve 64 is coupled to the controller 70 via a signal line so that the controller 70 can direct the cold water valve 64 to open or close. The hot water valve 62 is coupled to the controller 70 via a signal line so that the controller 70 can direct the hot water valve 62 to open or close. The icemaker valve 68 is coupled to the controller 70 via a signal line so that the controller 70 can direct the icemaker valve 68 to open or close. The cold water dispenser valve 66 is coupled to the controller 70 via a signal line so that the controller 70 can direct the cold water dispense valve 66 to open or close. The heating assembly 30 is coupled to the controller 70 via a signal line so that the controller 70 can direct the heating assembly 30 to activate or deactivate the flow-through heating element 31.

Hence, the control system 28 including the controller 70 may be operated to control operation of the refrigerator 10. In particular, the controller 70 executes a routine including, among other things, a control scheme in which the controller 70 monitors outputs of the sensors 80, 85 in order to inform a user of detected scale build-up and to control the availability of hot water when water system 26 contains built up scale. To do so, the controller 70 communicates with the sensors 80, 85 in order to determine, among other things, if the water system 26, (and more particularly, if the components of the hot water line 35 that conducts water for the hot water function) is likely to contain a predetermined amount of scale build-up as indicated by an elevated temperature or pressure of water flowing through the dispenser 20. In some embodiments, the controller may communicate with both temperature sensors 83, 85 and compare the temperature rise across the heating assembly 30 to determine scale build up. Armed with this data, the controller 70 determines if a descaling cycle is desirable and if continued operation of the hot water function is allowable. Once it is determined if a descaling cycle is found to be desirable, the controller 70 can direct the user interface 72 to display a request for a user to initiate the descaling cycle. If the controller 70 determines that the continued operation of the hot water function is not allowable, the controller 70 can disable the water system 26 from providing hot water to the dispenser 20.

Figure 3:
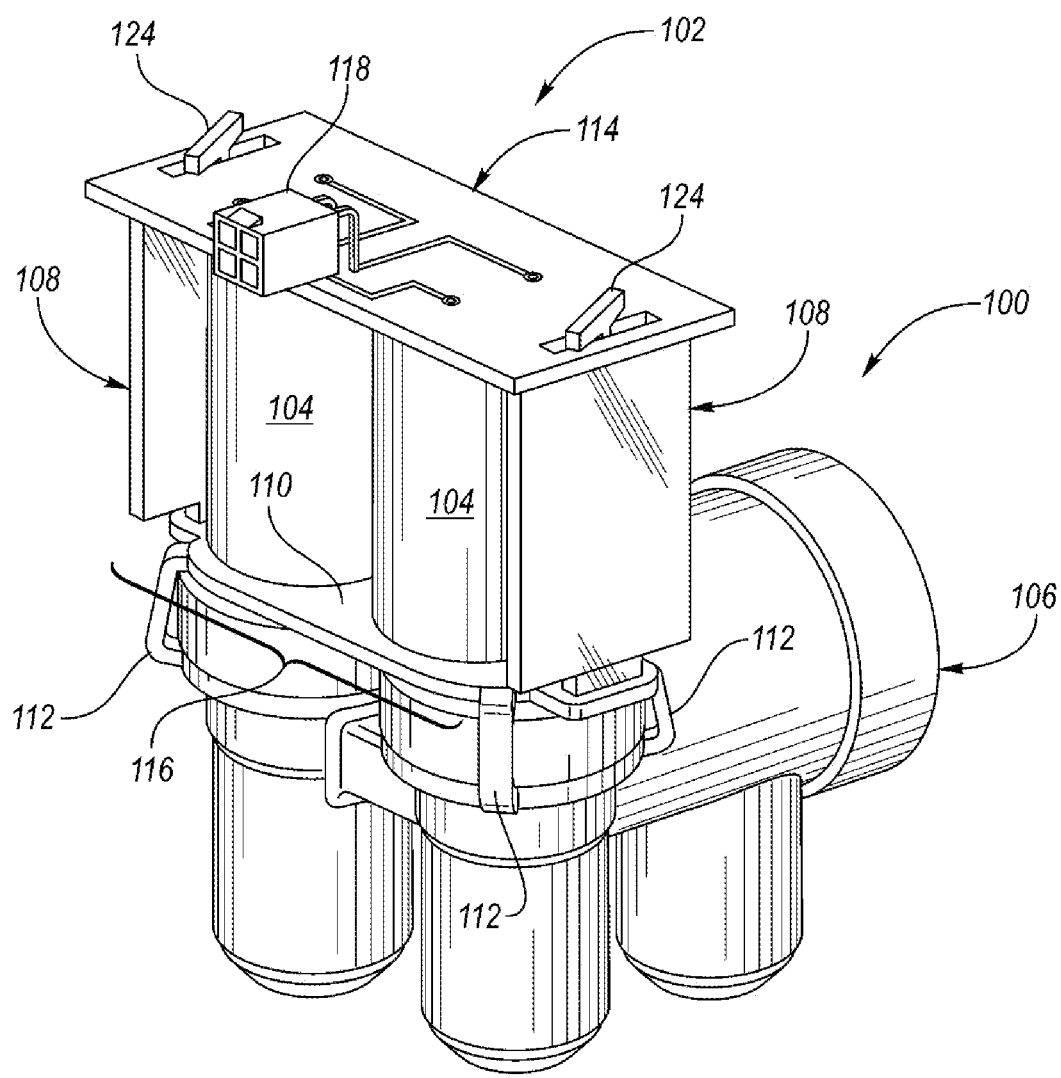
FIG. 3 is an isometric view of a first valve assembly.
Figure 4:
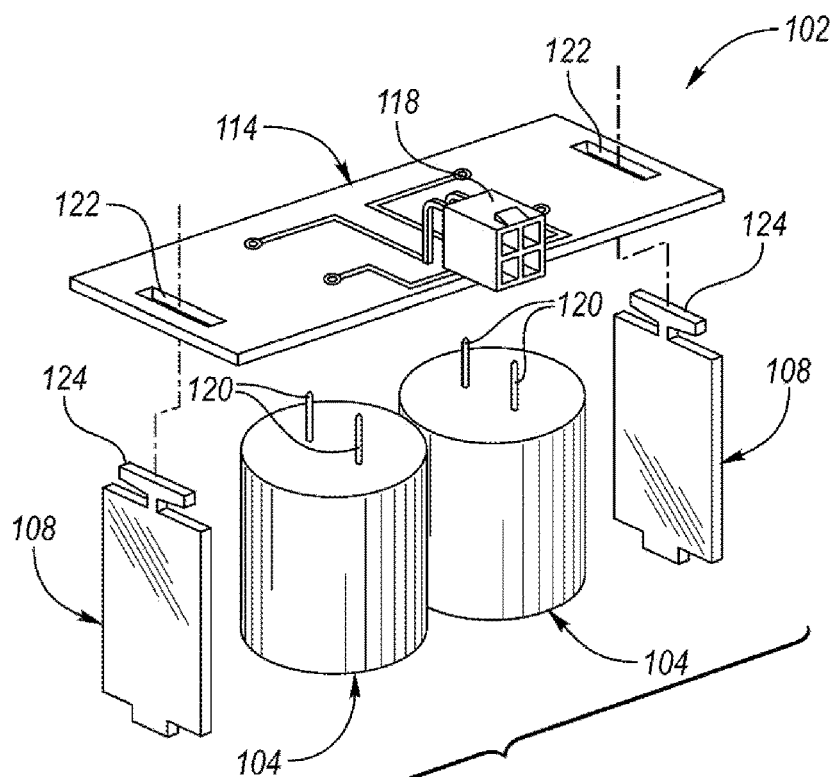
FIG. 4 is an exploded view of a first embodiment of a mounting system for one or more actuators of the first valve assembly.

Referring to FIGS. 3 and 4, a first valve assembly 100, including a mounting system 102 for one or more valve actuators 104 of the first valve assembly 100 is illustrated. The valve assembly 100 may include a valve 106 that is configured to control fluid flow between fluid conduits or fluid within a fluid circuit (e.g., hot water line 35 cold water line 37, or water inlet line 41). The valve 106 may include a single valve mechanism or multiple valve mechanisms (e.g., the valve may represent any one of the valves 36, 62, 64, 66, 68 or may represent two or more of the valves 36, 62, 64, 66, 68) that are configured to control fluid flow between multiple fluid conduits or fluid circuits. In the illustrated example in FIGS. 3 and 4, the valve 106 includes two valve mechanisms. However, it should be understood that this disclosure is not limited to the illustrated example in FIGS. 3 and 4 and that the valve 106 may include one or more valve mechanisms.

The one or more actuators 104 may be electrical solenoids that are connected to a power source and are in communication with and controlled by the controller 70. The one or more actuators 104 may also be referred to as at least one actuator, one or more solenoids, or at least one solenoid. The one or more actuators 104 are disposed on the valve 106. The one or more actuators 104 could alternatively be electric motors. Each actuator 104 is configured to operate one of the valve mechanisms of the valve 106 to control fluid flow through fluid conduits. More specifically, each actuator 104 may be configured to transition each valve mechanism between opened, closed, and partially opened positions.

The mounting system 102 may be configured to secure the one or more actuators 104 to the valve 106. The mounting system 102 may also be referred to as a framework, a bracket, or a bracket system. The mounting system 102 includes first and second support members 108 that are secured to the valve 106. The first and second support members 108 may also be referred to as first and second upright members or first and second side members. The first and second support members 108 are spaced apart from each other and are secured to the valve 106 on opposing sides of the one or more actuators 104 such that the one or more actuators 104 are sandwiched between the first and second support members 108. More specifically, the first and second support members 108 may be secured to a valve member or valve plate 110 that is disposed on top of the valve 106. The valve plate 110 may have protrusions or prongs 112 extending therefrom. The prongs 112 may engage one or more ridges on the valve 106 to secure the valve plate 110 to the valve 106.

A crossmember 114 is secured to the first and second support members 108 such that the first and second support members 108 and the crossmember 114 form a U-shape having an open end 116. The crossmember 114 is secured to opposing ends of the first and second support members 108 relative to the valve 106. Each of the support members 108 are secured to the valve 106 (or more specifically to the valve plate 110) such that the one or more actuators 104 are sandwiched between the first and second support members 108 and such that the one or more actuators 104 are sandwiched between the valve 106 (or more specifically the valve plate 110) and the crossmember 114. Stated in other terms, the valve 106, first and second support members 108, and the crossmember 114 form a closed loop around the one or more actuators 104.

An electrical connector 118 is electrically connected to the one or more actuators 104. The electrical connector 118 is secured to the crossmember 114 on an opposing side of the crossmember 114 relative to the one or more actuators 104. The electrical connector 118 is configured to connect the one or more actuators 104 to a power source and/or the controller 70. The crossmember 114 may be a printed circuit board that is electrically connected to the one or more actuators 104. More specifically, the one or more actuators 104 may include terminals 120 that engage the printed circuit board that forms the crossmember 114 to establish the electrical connection between the one or more actuators 104 and the printed circuit board. The electrical connector 118 may be electrically connected to the one or more actuators 104 via the printed circuit board that forms the crossmember 114.

The crossmember 114 may define first and second slots 122 and the first and second support members include first and second wings or tabs 124, respectively. The first and second tabs 124 may extend through the first and second slots 122, respectively, and engage the crossmember 114 to secure the first and second support members 108 to the crossmember 114. More specifically, the first and second tabs 124 may be deformed after the first and second tabs 124 have extended through the first and second slots 122, respectively, as illustrated in FIG. 3 in order to affix the first and second support members 108 to the crossmember 114.

Figure 5:
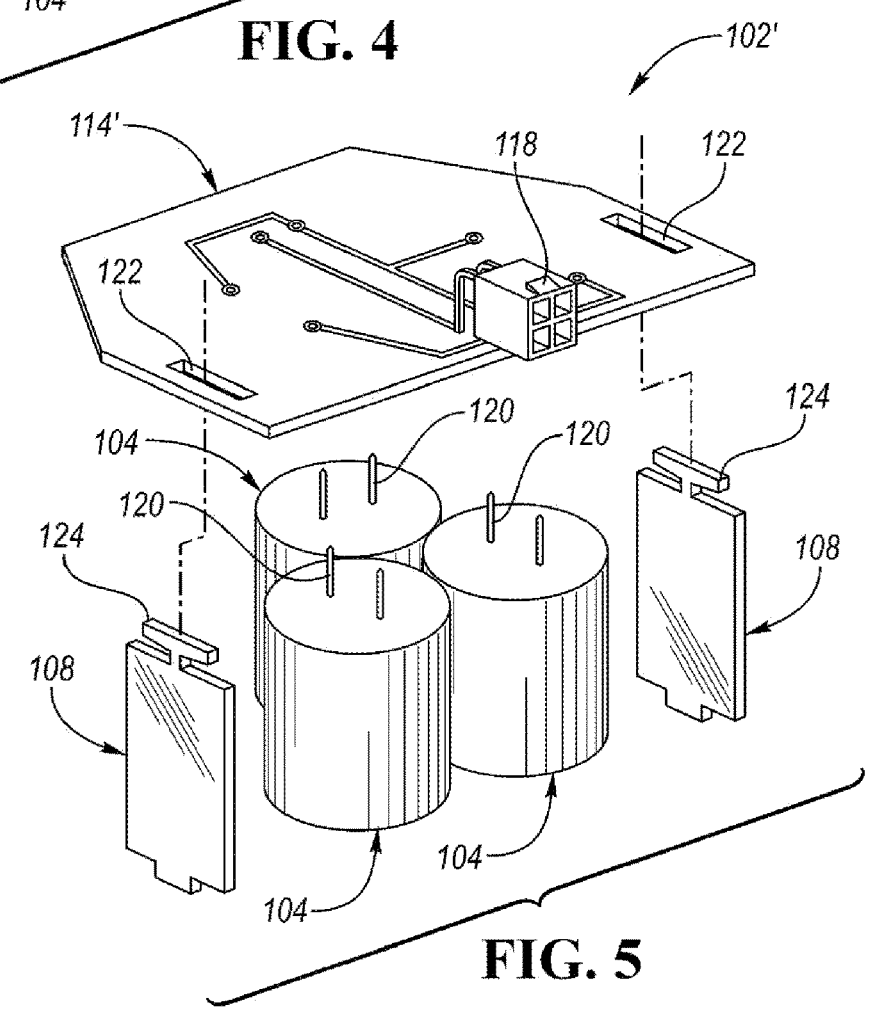
FIG. 5 is an exploded view of an alternative version of the first embodiment of the mounting system for the one or more actuators of the first valve assembly.

Referring to FIG. 5, an exploded view of an alternative version of the first embodiment of the mounting system 102' for one or more valve actuators 104 is illustrated. The alternative version of the first embodiment of the mounting system 102' includes the same structure and functionality as mounting system 102 unless otherwise state herein. The main difference between the alternative version of the first embodiment of the mounting system 102' and mounting system 102 is that a printed circuit board that forms an alternative version of the crossmember 114' is configured to establish an electrical connection between the three actuators 104 and the electrical connector 118. This an alternative version of the first embodiment of the mounting system 102' illustrates that the first valve assembly 100 may include more than two actuators 104. However, it should be understood that the valve assembly 100 may include any number of actuators 104 that is one or greater than one, the same principle applying to all embodiments describe herein.

Figure 6:
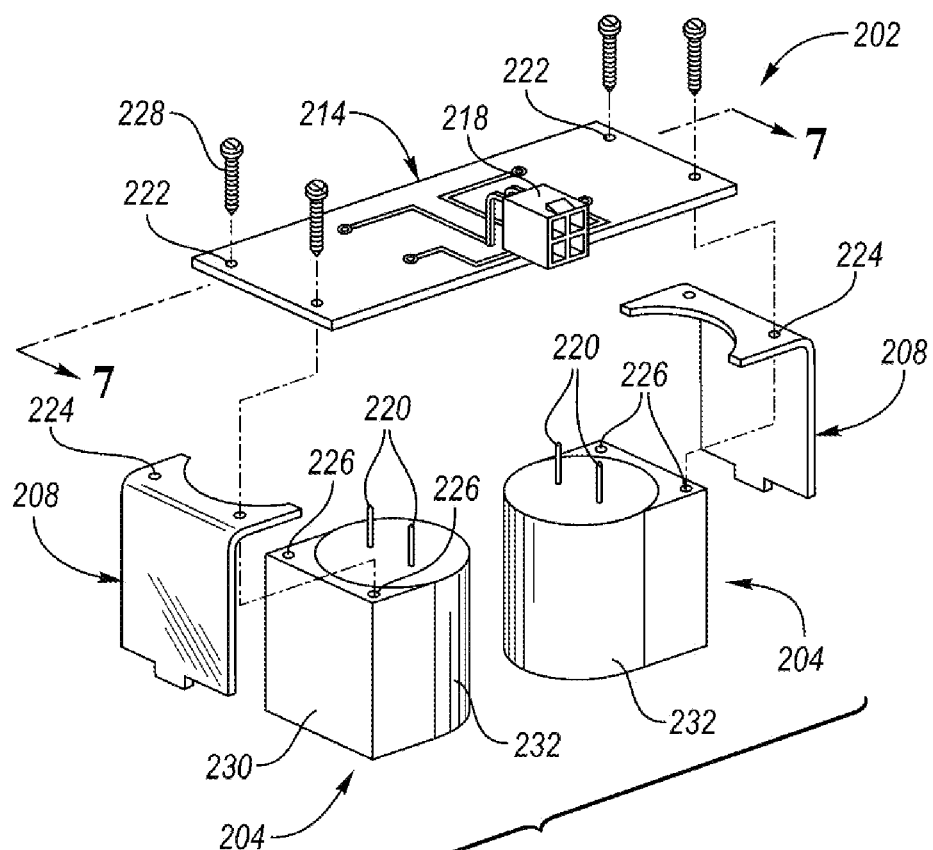
FIG. 6 is an exploded view of a second embodiment of the mounting system for the one or more actuators of the first valve assembly.
Figure 7:
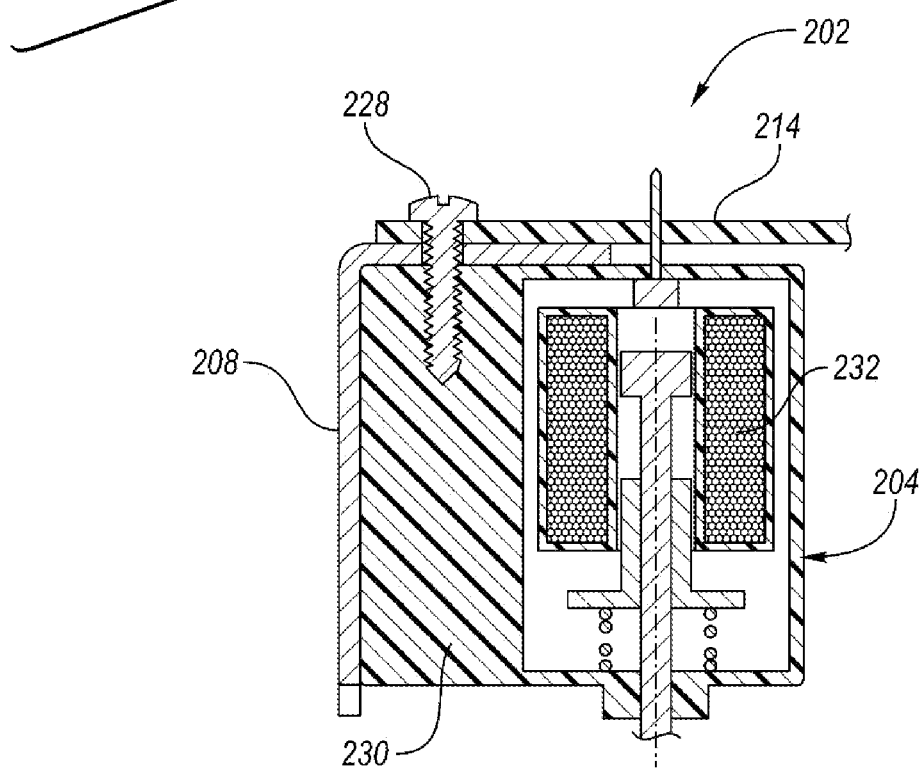
FIG. 7 is a partial cross-sectional view taken along line 7-7 in FIG. 6 with the second embodiment of the mounting system in an unexploded state.

Referring to FIGS. 6 and 7, a second embodiment of a mounting system 202 for one or more valve actuators 204 of the first valve assembly 100 is illustrated. The one or more actuators 204 may be electrical solenoids that are connected to a power source and are in communication with and controlled by the controller 70. The one or more actuators 204 may also be referred to as at least one actuator, one or more solenoids, or at least one solenoid. The one or more actuators 204 are disposed on the valve 106. Each actuator 204 is configured to operate one of the valve mechanisms of the valve 106 to control fluid flow through fluid conduits. More specifically, each actuator 104 may be configured to transition each valve mechanism between opened, closed, and partially opened positions.

The mounting system 202 may be configured to secure the one or more actuators 204 to the valve 106. The mounting system 202 may also be referred to as a framework, a bracket, or a bracket system. The mounting system 202 includes first and second support members 208 that are secured to the valve 106. The first and second support members 208 may be L-shaped. The first and second support members 208 may also be referred to as first and second upright members or first and second side members. The first and second support members 208 are spaced apart from each other and are secured to the valve 106 on opposing sides of the one or more actuators 204 such that the one or more actuators 204 are sandwiched between the first and second support members 208. More specifically, the first and second support members 208 may be secured to the valve member or valve plate 110 that is disposed on top of the valve 106 in the same manner as the first and second support members 108 are secured to the valve pale 110 in FIG. 3.

A crossmember 214 is secured to the first and second support members 208 such that the first and second support members 208 and the crossmember 214 form a U-shape having an open end. The crossmember 214 is secured to opposing ends of the first and second support members 208 relative to the valve 106. Each of the support members 208 are secured to the valve 106 (or more specifically to the valve plate 110) such that the one or more actuators 204 are sandwiched between the first and second support members 208 and such that the one or more actuators 204 are sandwiched between the valve 106 (or more specifically the valve plate 110) and the crossmember 214. Stated in other terms, the valve 106, first and second support members 208, and the crossmember 214 form a closed loop around the one or more actuators 204.

An electrical connector 218 is electrically connected to the one or more actuators 204. The electrical connector 218 is secured to the crossmember 214 on an opposing side of the crossmember 214 relative to the one or more actuators 204. The electrical connector 218 is configured to connect the one or more actuators 204 to a power source and/or the controller 70. The crossmember 214 may be a printed circuit board that is electrically connected to the one or more actuators 204. More specifically, the one or more actuators 204 may include terminals 220 that engage the printed circuit board that forms the crossmember 214 to establish the electrical connection between the one or more actuators 204 and the printed circuit board. The electrical connector 218 may be electrically connected to the one or more actuators 204 via the printed circuit board that forms the crossmember 214.

The crossmember 214 may define a first set of orifices 222, the first and second support members 208 may define a second set of orifices 224 that are aligned with the first set of orifices 222, and the one or more actuators 204 may define a third set of orifices 226 that are aligned with the first set of orifices 222 and the second set of orifices 224. Each fastener of a plurality of fasteners 228 may be configured to engage one orifice of the first set of orifices 222, one orifice of the second set of orifices 224, and one orifice of the third set of orifices 226 to secure the first and second support members 208 and the crossmember 214 to the one or more actuators 204. Each of the first set of orifices 222 and second set of orifices 224 may be through holes, while each of the third set of orifices 226 may be tapped holes that engage the fasteners 228. The one or more actuators 204 may include additional material 230 that protrudes radially outward of the mechanism of the one or more actuators (e.g., an electrical coil 232 of solenoid), where the additional material defines the third set of orifices 226 in order to prevent interference between the mechanism of the one or more actuators and the fasteners 228.

Figure 8:
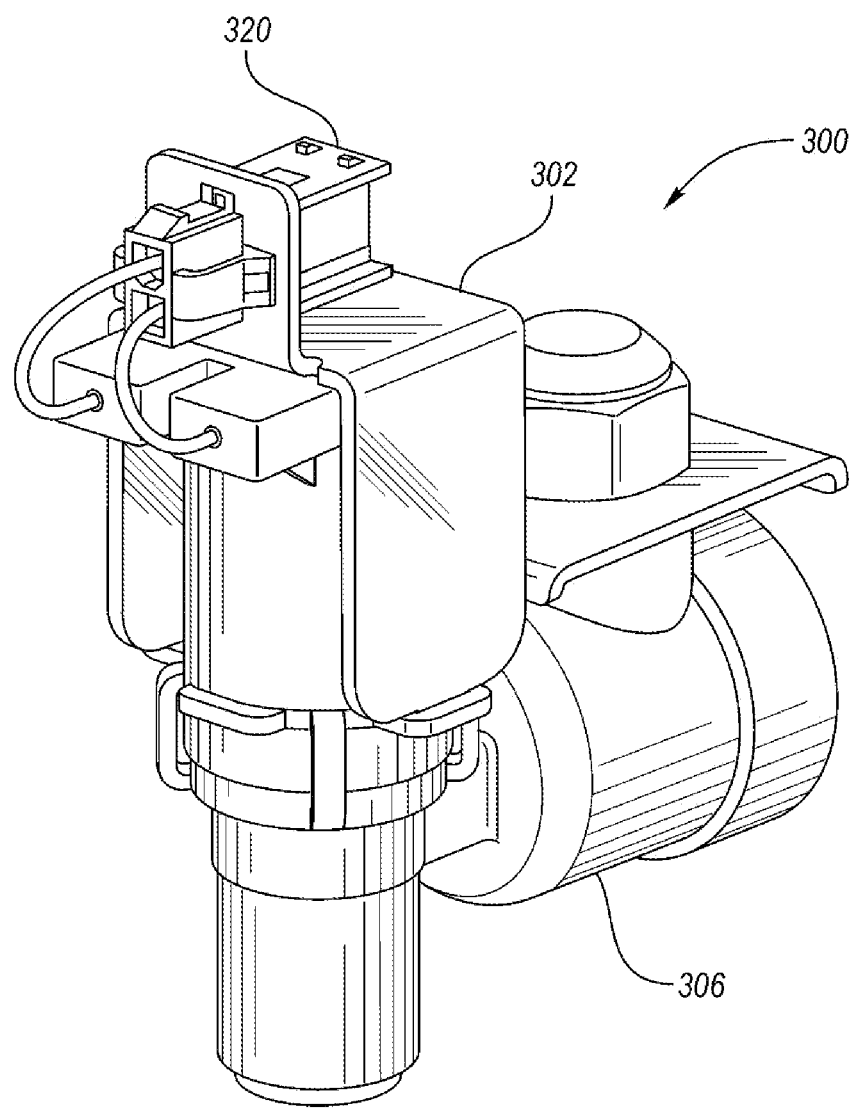
FIG. 8 is an isometric view of a second valve assembly.
Figure 9:
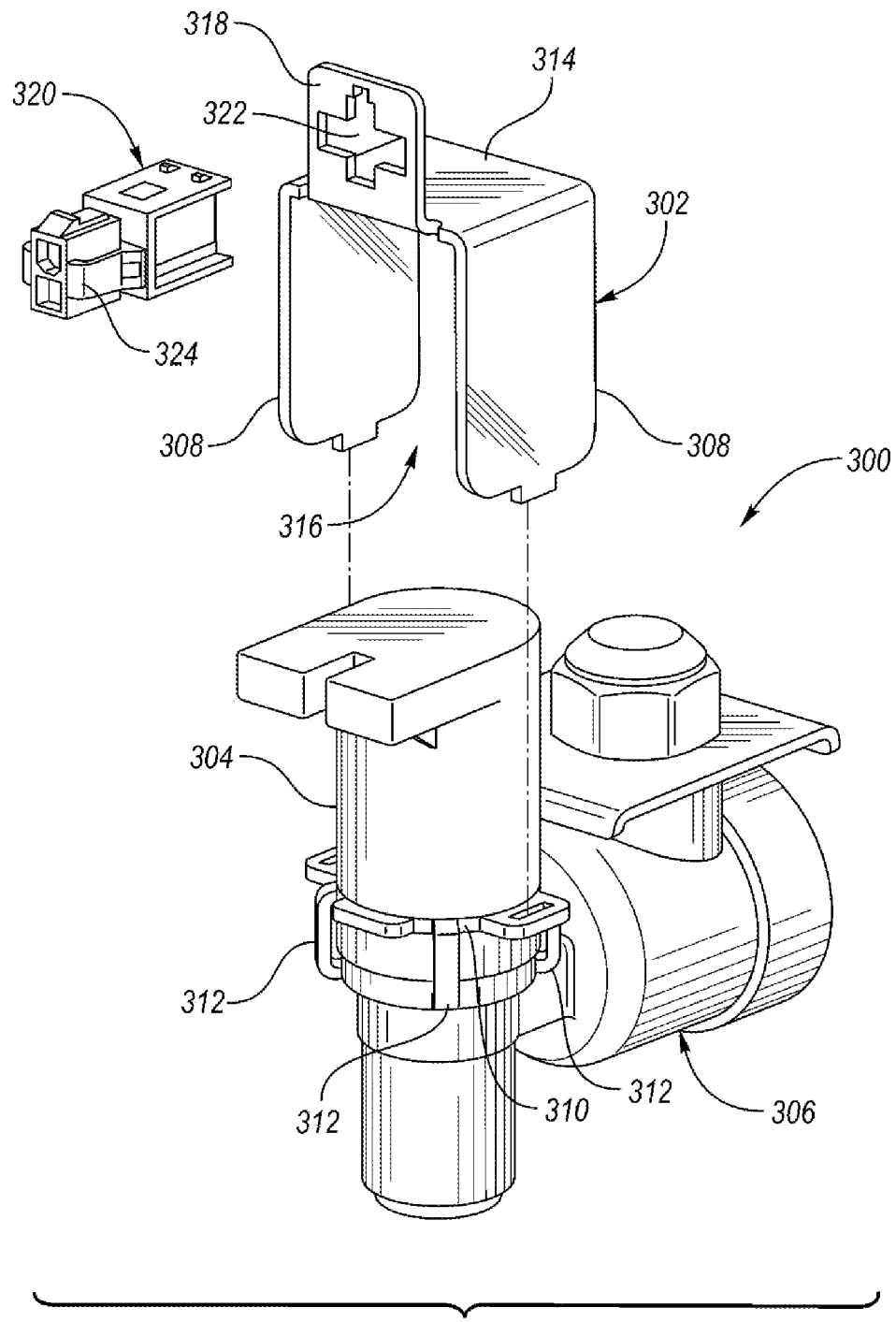
FIG. 9 is an exploded view of the second valve assembly.

Referring to FIGS. 8 and 9, a second valve assembly 300, including a third embodiment of a mounting system 302 for one or more valve actuators 304 of the second valve assembly 300 is illustrated. The second valve assembly 300 may include a valve 306 that is configured to control fluid flow between fluid conduits or fluid within a fluid circuit (e.g., hot water line 35 cold water line 37, or water inlet line 41). The valve 306 may include a single valve mechanism or multiple valve mechanisms (e.g., the valve may represent any one of the valves 36, 62, 64, 66, 68 or may represent two or more of the valves 36, 62, 64, 66, 68) that are configured to control fluid flow between multiple fluid conduits or fluid circuits. In the illustrated example in FIGS. 8 and 9, the valve 306 includes one valve mechanism. However, it should be understood that this disclosure is not limited to the illustrated example in FIGS. 8 and 9 and that the valve 306 may include one or more valve mechanisms.

The one or more actuators 304 may be electrical solenoids that are connected to a power source and are in communication with and controlled by the controller 70. The one or more actuators 304 may also be referred to as at least one actuator, one or more solenoids, or at least one solenoid. The one or more actuators 304 are disposed on the valve 306. Each actuator 304 is configured to operate one of the valve mechanisms of the valve 306 to control fluid flow through fluid conduits. More specifically, each actuator 304 may be configured to transition each valve mechanism between opened, closed, and partially opened positions.

The mounting system 302 may be configured to secure the one or more actuators 304 to the valve 306. The mounting system 302 may also be referred to as a framework, a bracket, or a bracket system. The mounting system 302 includes first and second support members 308 that are secured to the valve 306. The first and second support members 308 may also be referred to as first and second upright members or first and second side members. The first and second support members 308 are spaced apart from each other and are secured to the valve 306 on opposing sides of the one or more actuators 304 such that the one or more actuators 304 are sandwiched between the first and second support members 308. More specifically, the first and second support members 308 may be secured to a valve member or valve plate 310 that is disposed on top of the valve 306. The valve plate 310 may have protrusions or prongs 312 extending therefrom. The prongs 312 may engage one or more ridges on the valve 306 to secure the valve plate 310 to the valve 306.

A crossmember 314 is secured to the first and second support members 308 such that the first and second support members 308 and the crossmember 314 form a U-shaped bracket having an open end 316. The crossmember 314 is secured to opposing ends of the first and second support members 308 relative to the valve 306. Each of the support members 308 are secured to the valve 306 (or more specifically to the valve plate 310) such that the one or more actuators 304 are sandwiched between the first and second support members 308 and such that the one or more actuators 304 are sandwiched between the valve 306 (or more specifically the valve plate 310) and the crossmember 314. Stated in other terms, the valve 306, first and second support members 308, and the crossmember 314 form a closed loop around the one or more actuators 304.

The mounting system 302 includes a plate 318 extending from the crossmember 314 and away from the valve 306 and away from the open end 316. An electrical connector 320 is secured to the plate 318. Stated in other terms, the electrical connector 320 may be said to be connected to the crossmember 314 via the plate 318. The plate 318 plate defines an orifice 322. The electrical connector 320 engages the plate within the orifice 322 and/or proximate the orifice 322 to secure the electrical connector 320 to the plate 318. More specifically, the electrical connector 320 may include at least one clip 324 configured to engage the plate 318 proximate the orifice 322 to secure the electrical connector 320 to the plate 318.

It should be understood that the designations of first, second, third, fourth, etc. for any component, state, or condition described herein may be rearranged in the claims so that they are in chronological order with respect to the claims. It should be further understood that the refrigerator 10 described herein is for illustrative purposes only and that the any of the valve assemblies and mounting systems for the valve assembly actuators described herein may be utilized in any refrigerator or other system that includes a fluid or water system.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A valve assembly comprising:
a valve configured to control fluid flow between fluid conduits;
at least one solenoid disposed on the valve and configured to operate the valve to control fluid flow through fluid conduits; and
a framework configured to secure the at least one solenoid to the valve, the framework having,
a plate (i) secured to a top of the valve and (ii) defining first and second apertures,
a first support member having a first protrusion extending downward therefrom,
a second support member (i) spaced apart from the first support member such that the at least one solenoid is sandwiched between the first and second support members and (ii) having a second protrusion extending downward therefrom, wherein the first and second protrusions are disposed within the first and second apertures to (a) position the first and second support members relative to the plate and (b) position the at least one solenoid relative to the valve, and
a printed circuit board electrically connected to the at least one solenoid and secured to opposing top ends of the first and second support members relative to the plate such that the at least one solenoid is sandwiched between the plate and the printed circuit board.

2. The valve assembly of claim 1 further comprising an electrical connector electrically connected to at least one solenoid and secured to the printed circuit board on an opposing side of the printed circuit board relative to at least one solenoid.

3. The valve assembly of claim 1, wherein the at least one solenoid comprises two or more solenoids.

4. The valve assembly of claim 1, wherein the printed circuit board defines first and second slots and the first and second support members include first and second tabs, respectively, wherein the first and second tabs each include an upward extending post and wings extending laterally outward from the respective post, and wherein the posts extend through the first and second slots, and the wings engage a top surface of the printed circuit board to secure the first and second support members to the printed circuit board.

5. The valve assembly of claim 1, wherein the printed circuit board defines a first set of orifices, the first and second support members define a second set of orifices, and the at least one solenoid defines a third set of orifices, and wherein each fastener of a plurality of fasteners engages one orifice of the first set of orifices, one orifice of the second set of orifices, and one orifice of the third set of orifices to secure the at least one solenoid to the valve.

6. A refrigerator appliance comprising:
a water system having,
a fluid circuit, and
a valve assembly configured to control flow through the fluid circuit, the valve assembly having, a valve, at least one actuator disposed on the valve, and a framework configured to secure the at least one actuator to the valve, the framework having,
a plate (i) secured to a top of the valve and (ii) defining first and second apertures,
first and second upright members (i) disposed on opposing sides of the at least one actuator, respectively, and (ii) having first and second protrusions, respectively, extending downward therefrom, wherein the first and second protrusions are disposed within the first and second apertures to (a) position the first and second upright members relative to the plate and (b) position the at least one actuator relative to the valve,
a crossmember spanning and secured to opposing top ends of the first and second upright members relative to the plate such that the plate, first upright member, the second upright member, and the crossmember form a closed loop around the at least one actuator, wherein the crossmember is a printed circuit board, and
an electrical connector electrically connected to the at least one actuator and secured to the crossmember on an opposing side of the crossmember relative to the at least one actuator.

7. The refrigerator appliance of claim 6, wherein the electrical connector is electrically connected to the at least one actuator via the printed circuit board.

8. The refrigerator appliance of claim 6, wherein the at least one actuator comprises two or more actuators.

9. The refrigerator appliance of claim 6, wherein the crossmember defines first and second slots and the first and second upright members include first and second tabs, respectively, wherein the first and second tabs each include an upward extending post and wings extending laterally outward from the respective post, and wherein the posts extend through the first and second slots and the wings engage a top surface of the crossmember to secure the first and second upright members to the crossmember.

10. The refrigerator appliance of claim 6, wherein the crossmember defines a first set of orifices, the first and second upright members define a second set of orifices, and the at least one actuator defines a third set of orifices, and wherein each fastener of a plurality of fasteners engages one orifice of the first set of orifices, one orifice of the second set of orifices, and one orifice of the third set of orifices to secure the at least one actuator to the valve.

11. The refrigerator appliance of claim 6, where the framework includes a second plate extending from the crossmember and away from the valve, wherein the second plate is substantially perpendicular to the crossmember.

12. The refrigerator appliance of claim 11, wherein the electrical connector is secured to the crossmember via the second plate.

13. The refrigerator appliance of claim 12, wherein the second plate defines an orifice, and wherein the electrical connector engages the second plate within the orifice to secure the electrical connector to the second plate.

14. The refrigerator appliance of claim 13, wherein the electrical connector includes at least one clip configured to engage the second plate proximate the orifice to secure the electrical connector to the second plate.

15. The refrigerator appliance of claim 6, wherein the at least one actuator comprises at least one solenoid.

16. A valve assembly comprising:
a valve configured to control fluid flow between fluid conduits;
a solenoid disposed on the valve and configured to operate the valve to control fluid flow through fluid conduits; and
a plate (i) secured to a top of the valve and (ii) defining first and second apertures,
a bracket having,
first and second side members having first and second protrusions, respectively, extending downward therefrom, wherein the first and second protrusions are disposed within the first and second apertures to (a) position the first and second side members relative to the plate and (b) position the solenoid relative to the valve,
a crossmember secured to tops of the first and second side members such that the first and second side members and the crossmember form a U-shape having an open end, wherein each of the side members are secured to the plate such that the solenoid is sandwiched between the first and second side members and such that the solenoid is sandwiched between the plate and the crossmember, and wherein the crossmember defines first and second slots and the first and second side members include first and second tabs, respectively, wherein the first and second tabs each include an upward extending post and wings extending laterally outward from the respective post, and wherein the posts extend through the first and second slots and the wings engage a top surface of the crossmember to secure the first and second side members to the crossmember, and
a second plate extending from the crossmember and away from the open end; and
an electrical connector electrically connected to the solenoid and secured to the second plate.

17. The valve assembly of claim 16, wherein the second plate defines an orifice, and wherein the electrical connector engages the second plate within the orifice to secure the electrical connector to the second plate.

18. The valve assembly of claim 17, wherein the electrical connector includes at least one clip configured to engage the second plate proximate the orifice to secure the electrical connector to the second plate.

* * * * *